United States Patent [19]
Godtfredsen

[11] 3,920,817
[45] Nov. 18, 1975

[54] COMPOSITION FOR TREATMENT OF ARTHRITIS
[75] Inventor: Wagn Ole Godtfredsen, Vaerlose, Denmark
[73] Assignee: Leo Pharmaceutical Products Ltd., Ballerup, Denmark
[22] Filed: Sept. 9, 1974
[21] Appl. No.: 504,247

[30] Foreign Application Priority Data
Sept. 13, 1973 United Kingdom............... 43156/73

[52] U.S. Cl. ............................................. 424/242
[51] Int. Cl.$^2$......................................... A61K 31/56
[58] Field of Search .................................. 424/242

[56] References Cited
FOREIGN PATENTS OR APPLICATIONS
805,719   10/1973   Belgium

*Primary Examiner*—Stanley J. Friedman
*Attorney, Agent, or Firm*—Cushman, Darby & Cushman

[57] ABSTRACT

New method of treating arthritis, which consists in administering to the animal body — including human beings — a compound of the class comprising fusidic acid, 24,25-dihydrofusidic acid, 17,20-24,25-tetrahydrofusidic acid, the conjugates of these acids with glycine and taurine, and non-toxic, pharmaceutically acceptable salts of the acids and conjugates.

In the treatment above, the active ingredients do not act in their capacity of being antibacterially active.

The invention also includes pharmaceutical compositions in dosage unit form for such treatment.

14 Claims, No Drawings

COMPOSITION FOR TREATMENT OF ARTHRITIS

DISCLOSURE OF INVENTION

The present invention relates to a pharmaceutical composition for the treatment of acute and chronic arthritis, to dosage units of the composition, and to methods for the treatment of acute and chronic arthritis.

More particularly, the invention relates to a pharmaceutical composition containing as active ingredient at least one member of the group consisting of fusidic acid, 24,25-dihydrofusidic acid, 17,20–24,25-tetrahydrofusidic acid, the conjugates of fusidic acid, 24,25-dihydrofusidic acid and 17,20–24,25-tetrahydrofusidic acid with glycine and taurine as well as non-toxic, pharmaceutically acceptable salts of these acids.

Fusidic acid, 24,25-dihydrofusidic acid and 17,20–24,25-tetrahydrofusidic acid and their salts are known compounds the preparation of which is described in the literature. The conjugates of fusidic acid, of 24,25-dihydrofusidic acid and of 17,20–24,25-tetrahydrofusidic acid with glycine and taurine and salts of the conjugates are also known and described in the Belgium Pat. No. 805,719, but their preparation and properties will also be described elaborately in the present application.

It has surprisingly been found that the compounds above cause a pronounced relief on patients suffering from arthritis when administered daily in appropriate dosage units.

Arthritis is a widespread disease which in serious cases may make such inroads on the general health of a person as to interfere with his normal functioning.

As is well known arthritis is a disease of the joints, characterized among others by changes in the synovial fluid and the synovial membranes, and by atrophic and hypertrophic changes in the bones.

The symptoms are pain of movement and swelling in the joints. Pain is variable, some patients proceed to extreme deformity without severe pain, but normally pain is an important factor influencing the production of deformity as it hinders movement, and the joints are kept in the position of greatest ease.

Various secondary symptons might also occur, especially in severe cases.

The ethiology of arthritis is still unknown, but many attempts have been made in order to relieve or cure the disease. Best known is the prolonged treatment with non-steroidal anti-inflammatory drugs such as salicylic acid, phenylbutazone or indomethacin, with gold preparations, such as Myocrisin, or with the corticosteroids. Unfortunately often severe side-effects may occur in the prolonged treatment with these drugs.

Fusidic acid is an antibiotic which has been widespreadly used in the clinic for many years in the prolonged treatment of patients suffering from infectious deseases, in particular caused by staphylococci.

During such treatments no important side-effects have been observed in patients. Fusidic acid, but also its hydrogenates, conjugates and salts thereof, are well-tolerated drugs fitted for prolonged treatment of patients.

It shall be expressly understood that when curing or relieving patients suffering from arthritis according to this invention, fusidic acid or its hydrogenates do not act in their known capacity of being antibacterials.

Other features caused by the steroid structure of fusidic acid and its hydrogenates, and of importance to their use in treatment of arthritis, are the pronounced protein binding and the capability of penetrating into bones and joints as well. In particular it has been demonstrated that fusidic acid as such or in the form of its salts is capable of penetrating into the synovial cavity to a high degree.

It is supposed that the active compounds in the pharmaceutical composition of the present invention act by potentiating the effect of fibrinolytic enzymes such as plasmin, or by acting synergistically with such enzymes contained in the synovial fluid with the consequence that the proteolytic activity of the plasmin is increased, again causing a desirable change in the composition of the synovial fluid of the affected joints.

Thus, from the therapeutic point of view, it is particularly advantageous that the relatively non-toxic fusidic acid, and its derivatives aforesaid, administered in low doses, have proved to give very promising results in the treatment of this hitherto incurable and often invalidating disease.

Preliminary clinical trials in the treatment of patients suffering from arthritis have revealed that in daily doses from 1 to 2 g the sodium fusidic did not cause any serious side effect when given continuously by the oral route over nearly one year. Indigestion was observed in some patients but usually overcome by taking the drug during meals.

In one series of patients (3 men and 5 women) having recent sero-positive polyarthritis the patients were treated by the oral route with sodium fusidate in capsules in a daily dose of 1.0 g. Treatment was continued for half a year during which period 6 patients appeared to benefit symptomatically, even when they stopped taking other drugs such as aspirin.

In another series 17 patients (9 men and 8 women) with early polyarthritis or palindromic rheumatism, 10 patients obtained symptomatic relief from taking sodium fusidate in a dose of 0.75 to 2.0 g daily. They stopped taking analgesic drugs notably aspirin (dose 4 to 16 tablets daily) whilst on fusidic acid.

All patients took the capsules with sodium fusidate (250 mg) 2 to 3 times a day with food.

The dosage of sodium fusidate was as follows:

| | |
|---|---|
| up to 1.0 g daily | 3 patients |
| up to 1.5 g daily | 11 patients |
| up to 2.0 g daily | 3 patients. |

In the second series above the duration with sodium fusidate was as follows:

4 patients took it for less than 1 month
2 patients took it for from 2 to 3 months
3 patients took it for from 3 to 6 months
8 patients took it for more than 11 months In the patients successfully treated with sodium fusidate there was generally observed relief of pain and reduction in joint inflammation, whereas disappearance of synovial swelling was less pronounced in some of the patients.

Several patients with mild polyarthritis remitted completely after 30 weeks on sodium fusidate in a dose of 0.75 to 1.0 g daily, but relapsed within the next one or two years' period. In the majority of cases the disease seems not to be cured and the treatment with the composition of the invention is supposed to be continued periodically for a reasonable period of time.

In cases where the joint signs remain, a successful combined treatment with gold preparations has been applied on certain patients causing an immediate remission with relief of pain and disappearance of joint signs as well.

The combined therapy with the preparation of the invention and gold in lower dose than usual is supposed to be advantageous with respect to the complete treatment of arthritis, also because a lower gold dose is desirable due to the known toxicity of gold preparation, often causing serious side-effects. Also combined therapy with other known drugs for treatment of arthritis may be advantageous depending on the condition of the patient.

The preferred form of administration in the treatment of arthritis according to the invention is the oral form of administration, but also the local or parenteral form of administration is valuable in some cases.

In the systemic treatment according to the invention a daily dose is from 250 milligrams to 3,000 milligrams, preferably from 500 to 1,500 milligrams, calculated as the free fusidic acid, 24,25-dihydrofusidic acid or 17,20–24,25-tetrahydrofusidic acid and administered as such or in the form of one of their non-toxic and pharmaceutically acceptable salts, or conjugates with glycine or taurine, or salts of these conjugates.

In the local treatment of affected joints a sparingly soluble active composition of the invention is appropriately given in the amount of from 50 to 500 mg in the form of suspensions.

The daily dose is appropriately given in dosage units once, twice or thrice a day continuously for a period up to several months, depending on the condition of the patient and under direction of a medical practitioner.

An appropriate dosage unit for systemic treatment contains from 200 to 1,000 milligrams, preferably from 250 to 500 milligrams in the form of tablets, capsules, or ampoules, or other forms usable for systemic administration may be applied such as aqueous or oily suspensions, containing from 25 to 250 mg per milliliter, preferably from 50 to 100 mg per milliliter.

For local treatment the dosage unit contains from 100–1,000 mg, preferably from 5–500 mg as an injectable form of presentation.

The compositions for the purpose of the invention can either be worked up to pharmaceutical forms of presentation such as granulate, tablets, pills, dragees, and suppositories, or the composition can be filled in medical containers such as capsules, or so far as mixtures are concerned, they may be filled in bottles or tubes or similar containers. Pharmaceutical organic or inorganic, solid or liquid carriers suitable for enteral, parenteral or local administration can be used to make up the composition. Water, gelatine, lactose, starch, magnesium stearate, talc, vegetable and animal oils and fats, benzyl alcohol, gum, polyalkylene glycol, petroleum jelly, cocoa butter, lanolin or other known carriers for medicaments are all suitable as carriers, while stabilizing agents, wetting and emulsifying agents, salts for varying the osmotic pressure or buffers for securing an adequate pH value of the composition can be used as auxiliary agents.

For granulates, tablets, capsules or dragees the pharmaceutical composition of the invention appropriately contains from 25 per cent to 98 per cent of the active substances of the invention, calculated as the free acid, and in oral suspensions the corresponding amount is appropriately from 2–25 per cent.

For parenteral use the compounds are preferably given by intravenous infusion of an aqueous solution containing from 0.1 to 2 per cent of the active ingredient, or the compound might be given by injection of the compounds in pharmaceutical compositions with from 1 to 20 per cent active ingredients.

As mentioned above the fusidic acid, the 24,25-dihydrofusidic acid or the 17,20–24,25-tetrahydrofusidic acid and their conjugates may be administered as their free acids, or as their salts, with pharmaceutical acceptable, non-toxic bases. The preferred salts are for instance the easily water-soluble sodium salts or the diethanolamine salts, but other pharmaceutically acceptable and non-toxic salts may be used, for instance salts which are slightly soluble in water in order to obtain a particular and an appropriate rate of absorption.

In general suitable salts are alkali metal salts and alkaline earth salts, for example sodium, potassium, magnesium or calcium salts, as well as salts with ammonia of suitable amines, for which, above all, aliphatic, cycloaliphatic, cycloaliphatic-aliphatic, primary, secondary or tertiary mono-, di-, tri-, and tetra-amines, as well as heterocyclic bases can be used to form salts, such amines being lower alkyl amines, for example triethylamine, hydroxy-lower alkylamines, for example 2-hydroxyethylamine, bis-(2-hydroxyethyl)-amine or tri-(2-hydroxyethyl)-amine; basic aliphatic esters of carboxylic acids, for example 4-aminobenzoic acid 2-diethylamino-ethyl ester; lower alkyleneamines, for example 1-ethylpiperidine; cycloalkylamines, for example bicyclohexylamine; or benzylamines for example N,N'-dibenzylethylenediamine, dibenzylamine, N-benzyl-$\beta$-phenethylamine, 1-ephenamine, procaine; N,N'-bis-dehydro-abielylethylenediamine.

The conjugates of fusidic acid, 24,25-dihydrofusidic acid or 17,20–24,25-tetrohydrofusidic acid with glycine and taurine are antibacterially inactive and are metabolized to a smaller extent than fusidic acid, or di- or tetrahydrofusidic acid.

The conjugates aforesaid of fusidic acid, 24,25-dihydrofusidic acid and 17,20–24,25-tetrahydrofusidic acid are obtainable by the procedure illustrated below.

Sodium taurofusidate

To a suspension of taurine (25 g) in dimethylformamide (400 ml) was added triethylamine (28 ml) and, after stirring for 30 minutes at room temperature, fusidic anhydride (51.6 g). After stirring for 70 hours at room temperature, the mixture was diluted with ethyl acetate (1.2 l), water (400 ml) was added, and the pH-value of the aqueous phase was adjusted to 2 by addition of 4 N hydrochloric acid with stirring. The aqueous layer was separated, the organic phase was washed with water (3 × 200 ml), dried, and evaporated in vacuo to yield a semicrystalline residue. In addition to a minor amount of fusidic anhydride, this residue consisted mainly of fusidic acid as revealed by thinlayer chromatography (solvent system methylene chloride: methanol 9:1; spray reagent: sulphuric acid, 98 percent). To the combined aqueous phase and washings (about 1.6 l) was added sodium chloride (60 g) and n-butanol (400 ml), and the mixture was shaken vigorously. The organic layer was separated and the aqueous phase re-extracted with n-butanol (2 × 200 ml). The combined n-butanol extracts were washed with saturated aqueous sodium chloride (3 × 100 ml), filtered, and concentrated to a volume of about 200 ml at reduced pressure. A crystalline precipitate of triethylammonium chloride which had formed was filtered off, and the filtrate was evaporated to dryness in vacuo to give a viscous oil. The oily residue was dissolved in methanol (200 ml), and the pH-value of the solution was adjusted to 10.8 by addition of 5 N aqueous sodium hydroxide with stirring. The mixture was evaporated to dryness in vacuo, the resulting residue was redissolved in 99% ethanol (150 ml) and filtered through dicalite to remove insoluble sodium chloride. The filtrate was again evaporated in vacuo to yield a yellowish oil. This residue was dissolved in methanol (35 ml), water (3.5 ml) was added, and crystallization of colourless material occurred upon scratching. After being kept in the refrigerator overnight, the mixture was diluted with ice-cold acetone (140 ml), the crystals were filtered off, washed with acetone, and dried to afford sodium taurofusidate, m.p. 220°–222°C. Concentration of the mother liquor at reduced pressure gave a second crop of the desired product, m.p. 216°–218°C. The two crops of crystalline sodium taurofusidate were recrystallized from methanol-acetone to give the pure compound, m.p. 224°–226°C., $[\alpha]_D^{20}$— 11° (c = 0.5 in methanol).

Found: C, 55.64; H, 8.35; N, 2.03; S, 4.52; $H_2O$ 8.56%

$C_{33}H_{52}NO_8SNa$, 3.5 $H_2O$ requires: C, 55.91; H, 8.39; N, 1.98; S, 4.52; $H_2O$, 8.90%.

Sodium tauro-24,25-dihydrofusidate

To a solution of sodium taurofusidate (3.54 g) in 96% ethanol (50 ml) was added 5% palladium on barium sulphate catalyst (0.7 g), and the mixture was shaken in a hydrogen atmosphere for 3.5 hours. The catalyst was filtered off, washed with 96% ethanol, and the filtrate evaporated to dryness. To a solution of the residue in 96% ethanol (4.6 ml) was added water (0.4 ml), followed by acetone (30 ml), and upon scratching crystallization began. After stirring for 1 hour at room temperature, the mixture was diluted with acetone (25 ml) and kept in the refrigerator overnight. The crystals were filtered off, washed with acetone, and dried to give sodium tauro-24,25-dihydrofusidate, m.p. 198°–202°C., $[\alpha]_D^{20}$— 14° (c = 0.5 in methanol).

Found: C, 56.70; H, 8.43; N, 1.99; S, 4.63; $H_2O$, 7.92% $C_{33}H_{54}NO_8SNa$, 3 $H_2O$ requires: C, 56.47; H, 8.62; N, 2.00; S, 4.57; $H_2O$, 7.92%.

Concentration of the mother liquor at reduced pressure afforded a second crop of the desired compound, m.p. 194°–200°C.

Glycofusidic acid

To a suspension of glycine (15 g) in dimethylformamide (400 ml) was added triethylamine (28 ml) and, after stirring for 30 minutes at room temperature, fusidic anhydride (51.6 g). After stirring for 70 hours at room temperature, the mixture was diluted with ethyl acetate (1.2 l), water (400 ml) was added, and the pH-value of the aqueous phase was adjusted to 2 by addition of 4 N hydrochloric acid with stirring. The organic phase was separated, washed with water (3 × 200 ml) and concentrated at reduced pressure to a volume of about 250 ml. To the concentrate was added water (200 ml), and the pH-value of the aqueous phase was adjusted to 7.5 by addition of saturated aqueous sodium bicarbonate with stirring. The aqueous phase was separated and the organic phase washed with water (2 × 100 ml), dried, and evaporated in vacuo to yield a semicrystalline product which, according to thinlayer chromatography consisted of a mixture of fusidic acid and fusidic anhydride.

To the combined aqueous phase and washings was added ethyl acetate (400 ml), and the pH-value of the aqueous phase was adjusted to 2 by addition of 4 N hydrochloric acid with stirring. The organic phase was separated, and the aqueous phase re-extracted with ethyl acetate (200 ml). The combined organic extracts were washed with water (2 × 50 ml), dried, and concentrated at reduced pressure to a volume of about 100 ml. The crystalline material which had precipitated was filtered off, washed with ethyl acetate, and dried to afford glycofusidic acid, m.p. 234°–236°C. Further concentration of the mother liquor gave a second crop of the desired compound, m.p. 228°–230°C. Recrystallization from methanol-ethyl acetate gave the analytical sample, m.p. 236°–238°C; $[\alpha]_D^{20}$— 21° (c = 0.5 in methanol).

Found: C, 68.91; H, 9.04; N, 2.51%. Calc. for $C_{33}H_{51}NO_7$: C, 69.08; H, 8.96; N, 2.44%

Glyco-24,25-dihydrofusidic acid

To a solution of glycofusidic acid (3.44 g) in 96% ethanol (70 ml) was added 5% palladium on barium sulphate catalyst (0.7 g), and the mixture was shaken in a hydrogen atmosphere for 2.5 hours. The catalyst was filtered off, washed with 96% ethanol, and the filtrate evaporated to dryness. The residue crystallized from ethyl acetate to yield the desired compound, m.p. 215°–217°C. Recrystallization from methanol-ethyl acetate raised the m.p. to 219°–220°C, $[\alpha]_D^{20}$— 27° (c = 0.5 in methanol).

Found: C, 68.57; H, 9.23; N, 2.39%. Calc. for $C_{35}H_{53}NO_7$: C, 68.84; H, 9.28; N, 2.43%.

Glyco-17,20–24,25-tetrahydrofusidic acid.

To a solution of glycofusidic acid (2.87 g) in 96% ethanol (50 ml) was added platinum oxide (0.3 g), and the mixture was shaken in a hydrogen atmosphere for one hour. The catalyst was filtered off, washed with 96% ethanol, and the filtrate was evaporated to dryness in vacuo. The amorphous residue was dissolved in methanol (15 ml), ethyl acetate (60 ml) was added, and the mixture was concentrated to about 15 ml at reduced pressure. Upon scratching, the desired compound crystallized. The crystalline precipitate was filtered off, washed with ethyl acetate, and dried to give glyco-17,2024,25-tetrahydrofusidic acid, m.p. 205°–209°C. Two recrystallizations from methanol-ethyl acetate raised the m.p. to 213°–215°C, $[\alpha]_D^{20}$— 29° (c = 0.5 in methanol).

Found: C, 68.37, H, 9.58, N, 2.43%. Calcd. for $C_{33}H_{55}NO_7$: C, 68.60, H, 9.59, N, 2.42%.

Sodium tauro-17,20–24,25-tetrahydrofusidate.

A solution of sodium taurofusidate (7.0 g) in 96% ethanol (100 ml) was shaken at room temperature under one atmosphere hydrogen in the presence of platinum oxide (0.7 g). In 90 minutes, 500 ml of hydrogen were absorbed and the comparison of hydrogen ceased. The catalyst was removed by filtration, and the filtrate was evaporated to dryness in vacuo. Crystallization of the residue from methanol-acetone afforded the desired compound.

The following non-limiting Examples are illustrative of the composition of the invention, and the use of the composition.

EXAMPLE 1

As an example of the dosage unit, the prescription below describes the preparation of suitable tablets containing each 0.250 gram of fusidic acid sodium salt.

|  | Grams |
| --- | --- |
| Fusidic acid sodium salt | 250 |
| lactose | 165 |
| Polyvinyl-pyrrolidone | 7 |
| Corn starch | 50 |
| Talc | 25 |
| Magnesium stearate | 3. |

The fusidic acid sodium salt and the lactose are screened through a 20 mesh per linear inch sieve and mixed together for 15 minutes. Thereafter the mixed powders are wetted with a solution of polyvinyl-pyrrolidone in 96% ethyl alcohol. The moist mass is passed through a 10 mesh per linear inch screen and then dried at 38°C. When the alcohol has evaporated the granules are broken on a 16 mesh per linear inch sieve and mixed with a corn starch, talc and magnesium stearate. The granulate is compressed into tablets at 0.50 gram weight using 16/32 inch punches and dies, yielding 1000 tablets each containing 0.250 gram of fusidic acid sodium salt.

Five patients suffering from chronic arthritis were treated with tablets as above for 3 months, receiving thrice a day two tablets.

During the first fortnight a significant improvement occurred in 4 of the 5 patients. Relief of pain was evident and there was observed a reduction in articular tenderness and swelling, muscular and articular stiffness and pain on motion.

All patients subjectively had a sense of well-being. Also the improvements were reflected in the clinical analysis in the form of the sedimentation rates which shortly after the beginning of the treatment increased, but after a fortnight normalized and kept its value normal for the entire period of treatment.

No side-effects were observed during the treatment.

EXAMPLE 2

In the particular preferred form of administration, capsules are employed of for instance gelatine or another material easily digestible and disintegrable in the intestines, containing 0.250 gram of the sodium salt of the conjugate of dihydrofusidic acid with taurine mixed with minor amounts of auxiliary substances to obtain a free-flowing powder fitting the purposes of filling capsules. The capsules are filled with the following ingredients:

|  | Grams |
| --- | --- |
| Taurodihydrofusidic acid sodium salt | 250 |
| Lactose | 27 |
| Magnesium stearate | 3 |

The ingredients are passed through a 60 mesh per linear inch sieve and mixed for 15 minutes. The mixture is filled into No. 0 gelatine capsules (Parke, Davis and Co.) using a semi-automatic capsule filling machine shaken by a vibrator. Each capsule contains 280 milligrams of mixture corresponding to 250 milligrams of the sodium salt of taurodihydrofusidic acid.

EXAMPLE 3

By the method described in Example 1 similar tablets containing sodium 24,25-dihydrofusidate or sodium 17,20-24,25-tetrahydrofusidate instead of sodium fusidate are prepared.

EXAMPLE 4

By the method described in Example 2 similar capsules containing sodium taurofusidate or sodium tauro-17,20–24,25-tetrahydrofusidate instead of sodium tauro-24,25-dihydrofusidate are prepared.

EXAMPLE 5

By the method described in Example 2 similar capsules containing glycofusidic acid, glyco-24,25-dihydrofusidic acid, or glyco-17,20–24,25-tetrahydrofusidic acid are prepared.

EXAMPLE 6

Capsules containing each 0.250 gram of the sodium salt of fusidic acid were prepared as follows:

Sodium fusidate (250 grams) was mixed with lactose (35 gram) and magnesium stearate (5 gram) and passed through a 60 mesh per linear inch sieve, and further mixed for 15 minutes.

Each capsule was filled with 290 milligram of the mixture.

EXAMPLE 7

Preparation of a suspension for oral use with following composition:

| Fusidic acid | 50.0 mg |
| --- | --- |
| Hydroxymethylcellulose | 4.0 mg |
| Glucose | 250.0 mg |
| Sodium phosphate | 7.0 mg |
| Citric acid | 4.5 mg |
| Potassium sorbate | 1.5 mg |
| Water | ad 1 ml |

Glucose, sodium phosphate, citric acid, and potassium sorbate are dissolved into water. The solution is filtered and micronized fusidic acid added to the filtrate, whereafter the pH is adjusted, if necessary, to the range pH 5.0 ± 0.2, and the volume corrected by adding water.

Having thus described my invention, what I claim as new and desire to secure by Letters Patent is:

1. A method of treating acute or chronic arthritis which comprises administering to a host in need of such treatment, an effective amount of a member of the group consisting of fusidic acid, 24,25-dihydrofusidic acid, 17,20–24,25-tetrahydrofusidic acid, a conjugate of fusidic acid, 24,25-dihydrofusidic acid and 17,20–24,25-tetrahydrofusidic acid with glycine and taurine, and a nontoxic, pharmaceutically acceptable salt thereof.

2. Method according to claim 1 in which the therapeutically active compound is administered by the oral route, in an amount from 250 to 3,000 mg per day.

3. Method according to claim 1 in which the therapeutically active compound is administered parenterally in amounts from 10 to 1000 mg.

4. Method according to claim 1 wherein fusidic acid or a non-toxic pharmaceutically acceptable salt thereof is used.

5. Method according to claim 2 wherein said compound is administered in an amount from 500 to 1,500 mg. per day.

6. Method according to claim 3 wherein said compound is administered in an amount from 50 to 500 mg. per day.

7. A pharmaceutical composition in dosage unit form for the treatment of patients suffering from arthritis, which comprises as a therapeutically active ingredient an effective amount of a compound selected from the group consisting of fusidic acid, 24,25-dihydrofusidic acid, 17,20–24,25-tetrahydrofusidic acid, and a conjugate of fusidic acid, 24,25-dihydrofusidic acid, and 17,20–24,25-tetrahydrofusidic acid with glycine and taurine, and a nontoxic, pharmaceutically acceptable salt thereof, the active compound being admixed with an atoxic, pharmaceutically acceptable carrier, and the dosage unit being between 200 to 1,000 mg, calculated as the free acid, of the therapeutically active compound.

8. A composition as claimed in claim 5 wherein the dosage unit is in the form of tablet.

9. A composition as claimed in claim 5 wherein the dosage unit is in the form of capsule.

10. A composition as claimed in claim 5 wherein the dosage unit is in the form of pill.

11. A composition as claimed in claim 7 wherein the dosage unit is in injectable form and contains from 10 to 1,000 mg calculated as the free acid of the therapeutically active compound.

12. A composition as claimed in claim 7 wherein the dosage unit is a suspension for oral use and contains the therepeutically active compound in an amount from 2 to 25 per cent.

13. The composition of claim 7 wherein the dosage unit is between 250 and 500 mg. of therapeutically active compound.

14. The composition of claim 11 wherein the dosage unit is between 50 to 500 mg. of therapeutically active compound.

* * * * *